United States Patent [19]

Iwabuchi

[11] Patent Number: 5,446,325
[45] Date of Patent: Aug. 29, 1995

[54] SPINDLE MOTOR AND DISK DRIVING APPARATUS USING THE SAME

[75] Inventor: Takayoshi Iwabuchi, Miyagi, Japan

[73] Assignee: Alps Electric Co., Ltd., Tokyo, Japan

[21] Appl. No.: 100,590

[22] Filed: Jul. 30, 1993

[30] Foreign Application Priority Data

Jul. 31, 1992 [JP] Japan .................. 4-205754

[51] Int. Cl.⁶ .................. H02K 7/14; H02K 1/12
[52] U.S. Cl. .................. 310/67 R; 310/254
[58] Field of Search .............. 310/67 R, 90, 254, 268; 360/98.07, 99.08, 99.04

[56] References Cited

U.S. PATENT DOCUMENTS

| | | | |
|---|---|---|---|
| 4,733,115 | 3/1988 | Barone et al. | 310/268 |
| 5,038,240 | 8/1991 | Isomura | 360/99.08 |
| 5,146,144 | 9/1992 | Lee | 310/268 |
| 5,195,002 | 3/1993 | Sakurai | 360/99.08 |
| 5,245,235 | 9/1993 | Nagai et al. | 310/67 R |
| 5,252,871 | 10/1993 | Inoue | 310/90 |

FOREIGN PATENT DOCUMENTS 54-147407 11/1979 Japan .................. 310/268

Primary Examiner—Clayton E. LaBalle
Attorney, Agent, or Firm—Guy W. Shoup; Patrick T. Bever

[57] ABSTRACT

Disclosed are a spindle motor and a disk driving apparatus using the same and, in particular, a disk driving apparatus loaded with a disk cartridge containing an information recording disk. The spindle motor includes a rotation table adapted rotate integrally with a rotating shaft, a driving magnet attached to a rotor, and a stator yoke to which driving coils are attached and which has a bearing for supporting the rotating shaft, the rotation table and the rotor being formed as separate members, the rotor having a fitting hole into which the rotation table is to be fitted from below, the rotating shaft of the rotation table being inserted into the bearing of the stator yoke, the rotor being mounted on the rotation table, the rotor being attracted toward the stator yoke by the magnetic force of the driving magnet and integrally combined with the rotation table.

1 Claim, 19 Drawing Sheets

FIG. 19  PRIOR ART
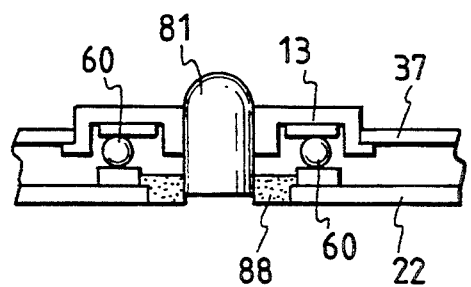
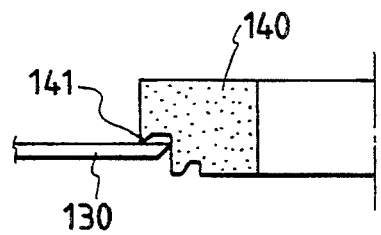
FIG. 20(a)
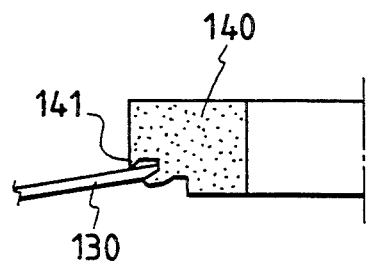
FIG. 20(b)
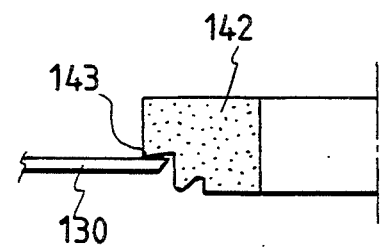
FIG. 21(a)
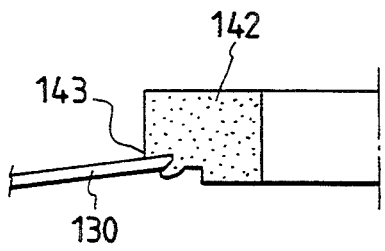
FIG. 21(b)

Magnetic Force

SPINDLE MOTOR AND DISK DRIVING APPARATUS USING THE SAME

BACKGROUND OF THE INVENTION

1. Field of the Invention

The present invention relates to a spindle motor in which a reduction in thickness has been achieved, and a disk driving apparatus using the same.

2. Description of the Related Art

A disk driving apparatus loaded with an information recording disk like a 3.5-inch floppy disk (hereinafter referred to as a "magnetic disk") is being widely used as an external storage apparatus for a personal computer, word processor or the like, and a reduction in thickness of such a disk driving apparatus is being promoted.

FIG. 23 is a diagram illustrating a spindle motor used in a conventional magnetic disk driving apparatus, and FIG. 24 is an exploded perspective view showing the essential part of FIG. 23.

As shown in these drawings, this spindle motor includes: a spindle shaft 81 fitted into a hole 89 of an oil-retaining metal bush 88 (a first bearing) so as to be rotatably supported therein; a rotor 82; a driving magnet 83 attached to the rotor 82; and driving coils 85 provided on a stator yoke 84, on which a ball bearing 80 (a second bearing section) is placed. The rotor 82 and the spindle shaft 81, which are rotatably supported by the ball bearing 80, are rotated by utilizing a force acting on the rotor 82 due to the current flowing through the driving coils 85 and the magnetic field of the driving magnet 83. Integrally attached to the rotor 82 is a spindle mount 86 having a through-hole into which the spindle shaft 81 is fitted. Numeral 87 indicates an FPC (flexible printed circuit board). The oil-retaining metal bush 88, which has the spindle shaft insertion hole 89, is fastened to the stator yoke 84. The stator yoke 84, the bush 88, etc. form a base unit.

When assembling this spindle motor, the ball bearing 80 is placed on the stator yoke 84, to which the bush 88 is firmly fastened, and the lower end portion of the spindle shaft 81, which is integral with the spindle mount 86 (the rotor 82), is inserted into the hole 89 of the bush 88 protruding from the inner ring of the ball bearing 80.

In the above-described spindle motor for disk driving apparatuses, the spindle mount 86 and the rotor 82 are formed into an integral unit by caulking or gluing prior to the final stage of assembly (i.e., joining this integral unit with the base unit). However, during the insertion of the spindle 81 into the hole 89 of the bush 88, this spindle is under the influence of the strong attracting force of the driving magnet 83, which attracts the rotor 82. Thus, it is rather difficult to insert the spindle shaft 81 into the small-diameter hole 89, this operation being effected by bringing the above integral unit to the base unit held in the horizontal position. Therefore, this operation, which requires a matching jig, etc., has been rather poor in workability. Further, if the rotor yoke 84 and the base unit are assembled together in an inclined position, the inner bore of the hole 89 of the bush 88 will be gouged, resulting in the shaft wobbling, etc., thereby adversely affecting the service life of the disk driving apparatus.

SUMMARY OF THE INVENTION

The present invention has been made with a view toward solving the above problem in the prior art. It is accordingly an object of this invention to provide a spindle motor in which the spindle shaft, the spindle mount and the rotor can be easily assembled without using any high-precision matching jig. Another object of the present invention is to provide a disk driving apparatus using this spindle motor which is highly reliable and can be easily assembled.

In accordance with this invention, a rotating table is incorporated into the bearing section of the stator yoke, the rotor being incorporated into the bearing section through the intermediation of this rotating table, the rotor being attracted to the stator yoke by the magnetic force of the driving magnet so as to allow the rotating table to be integrally incorporated. Accordingly, the rotating table and the rotor can be easily mounted on the spindle shaft without using any high-precision matching jig.

BRIEF DESCRIPTION OF THE DRAWINGS

FIG. 19 is a diagram illustrating, as a comparative example, another conventional spindle motor for magnetic disk driving apparatuses;

FIGS. 20(a) and 20(b) are diagrams illustrating still another modification of the bearing of a disk driving apparatus according to an embodiment of the present invention;

FIGS. 21(a) and 21(b) are diagrams illustrating the modification shown in FIGS. 20(a) and 20(b);

DETAILED DESCRIPTION OF THE PREFERRED EMBODIMENTS

Figure 1:
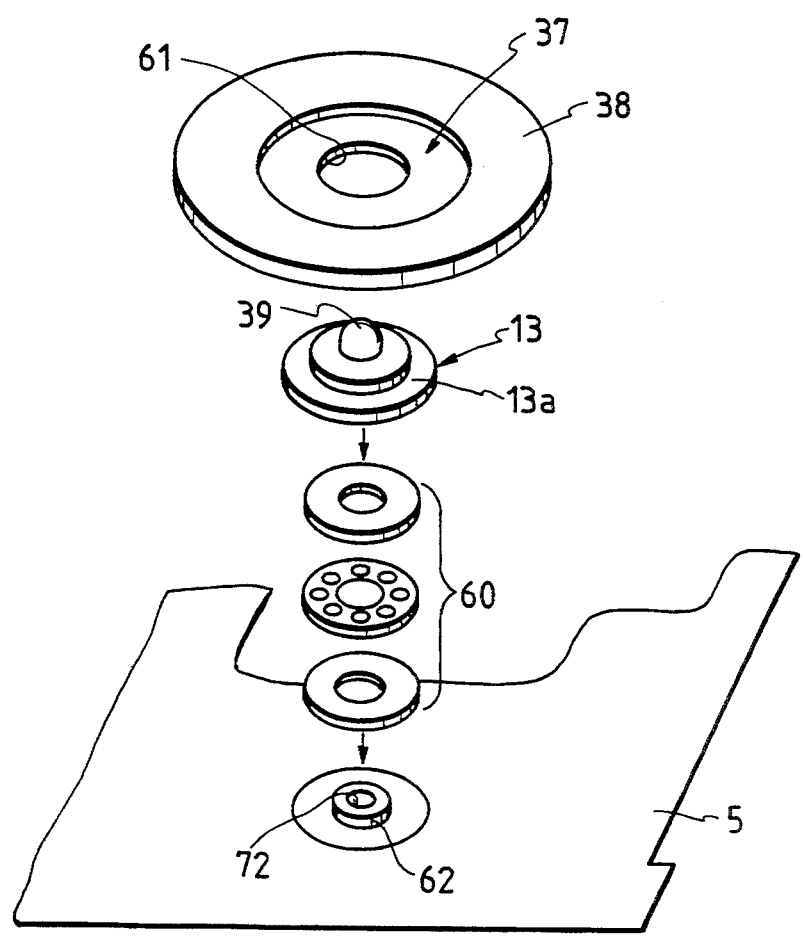
FIG. 1 is an exploded perspective view of an essential part of a spindle motor according to an embodiment of this invention.
Figure 2:
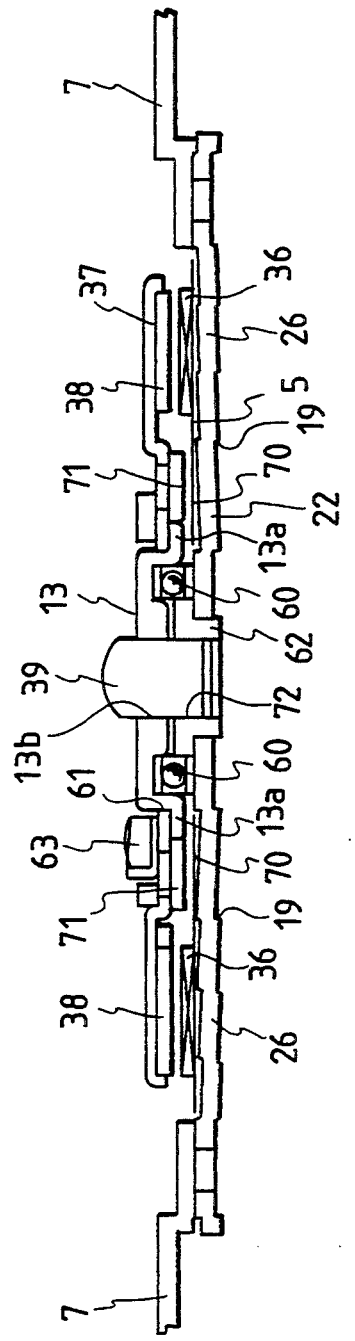
FIG. 2 is a longitudinal sectional view of a spindle motor according to an embodiment of this invention.
Figure 3:
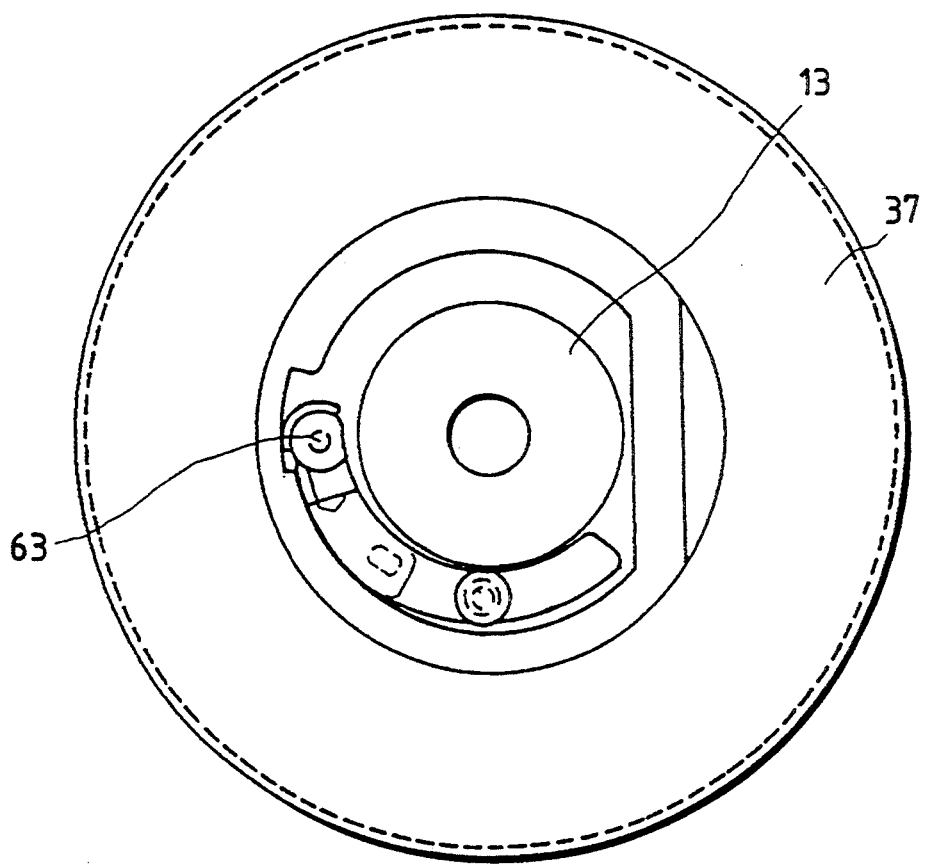
FIG. 3 is a plan view of FIG. 1.
Figure 4B:
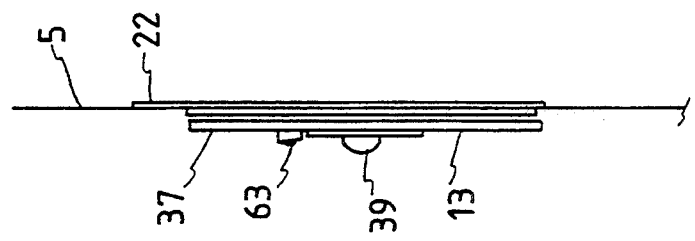
FIGS. 4(a) and 4(b) are a plan view and a front view showing a spindle motor attached to the chassis of a disk driving apparatus.
Figure 4A:
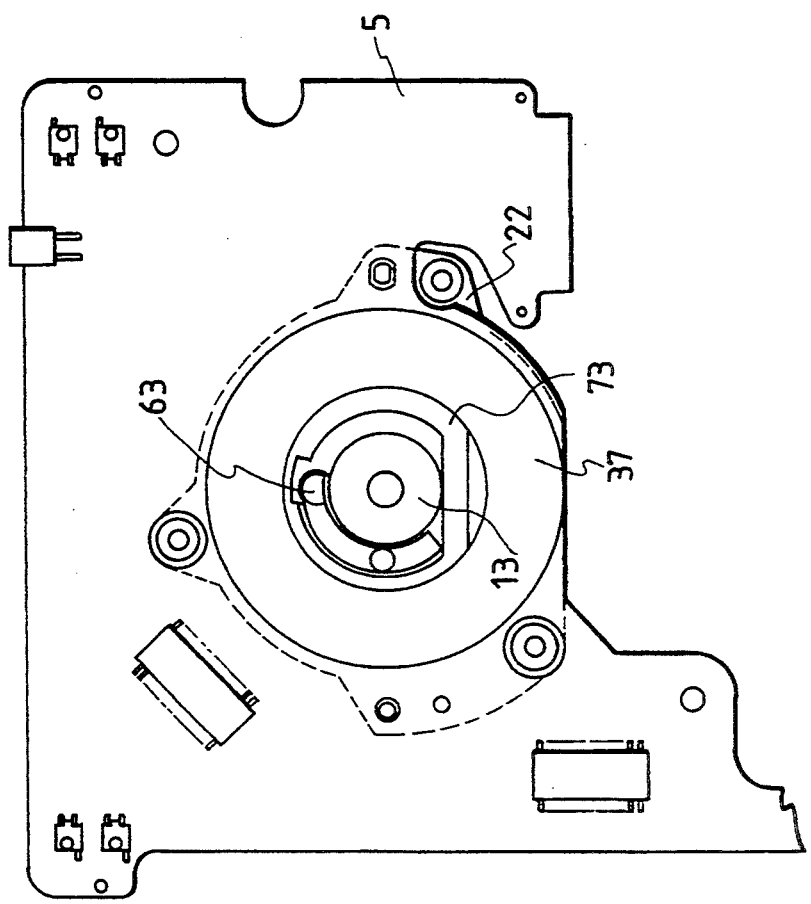
Figure 5:
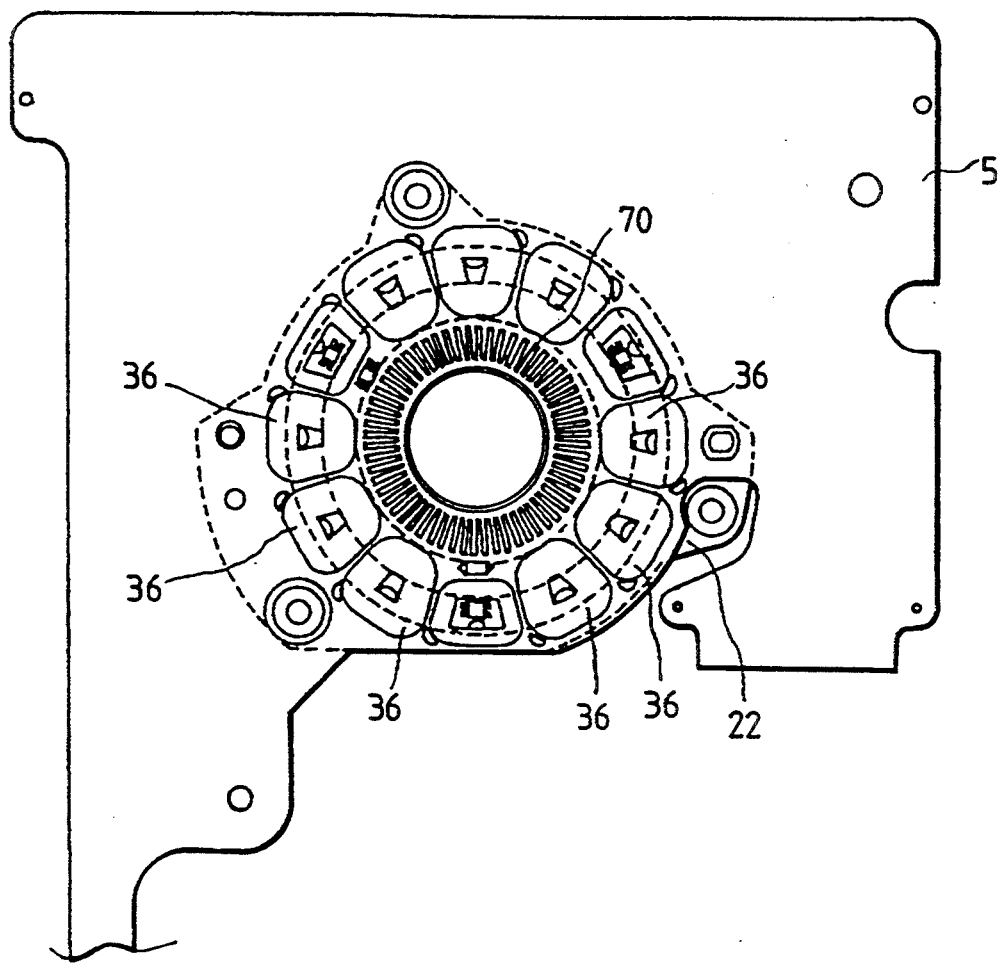
FIG. 5 is a see-through plan view of FIG. 4(a), showing the rotor and the spindle mount.

Embodiments of this invention will be described with reference to FIGS. 1 through 22. A disk driving apparatus 1 is mainly composed of: a lower cover 2 (FIG. 11); a lower insulating sheet 3; an FPC (flexible printed circuit board) 5 connected to a spindle motor 4; an upper insulating sheet 6 provided above the FPC 5; a chassis 7 provided on top of the upper insulating sheet 6; a carriage 10 provided on the chassis 7 having at its front end a pair of magnetic heads 8 and 9; a carriage transfer device 12 for transferring the carriage 10 in a radial direction with respect to a magnetic disk 11 described below; a spindle mount 13 protruding from the chassis 7 and adapted to be rotated by the spindle motor 4, which is attached to the chassis 7; a cartridge holder 15 holding a disk cartridge 14 within the apparatus and supported in such a way as to be vertically movable with respect to the chassis 7; a slide plate 18 for vertically moving the cartridge holder 15; an eject lever 16 for introducing the disk cartridge 14 to a loading position and pushing it therefrom to a discharge position; and an upper cover 17.

Figure 6:
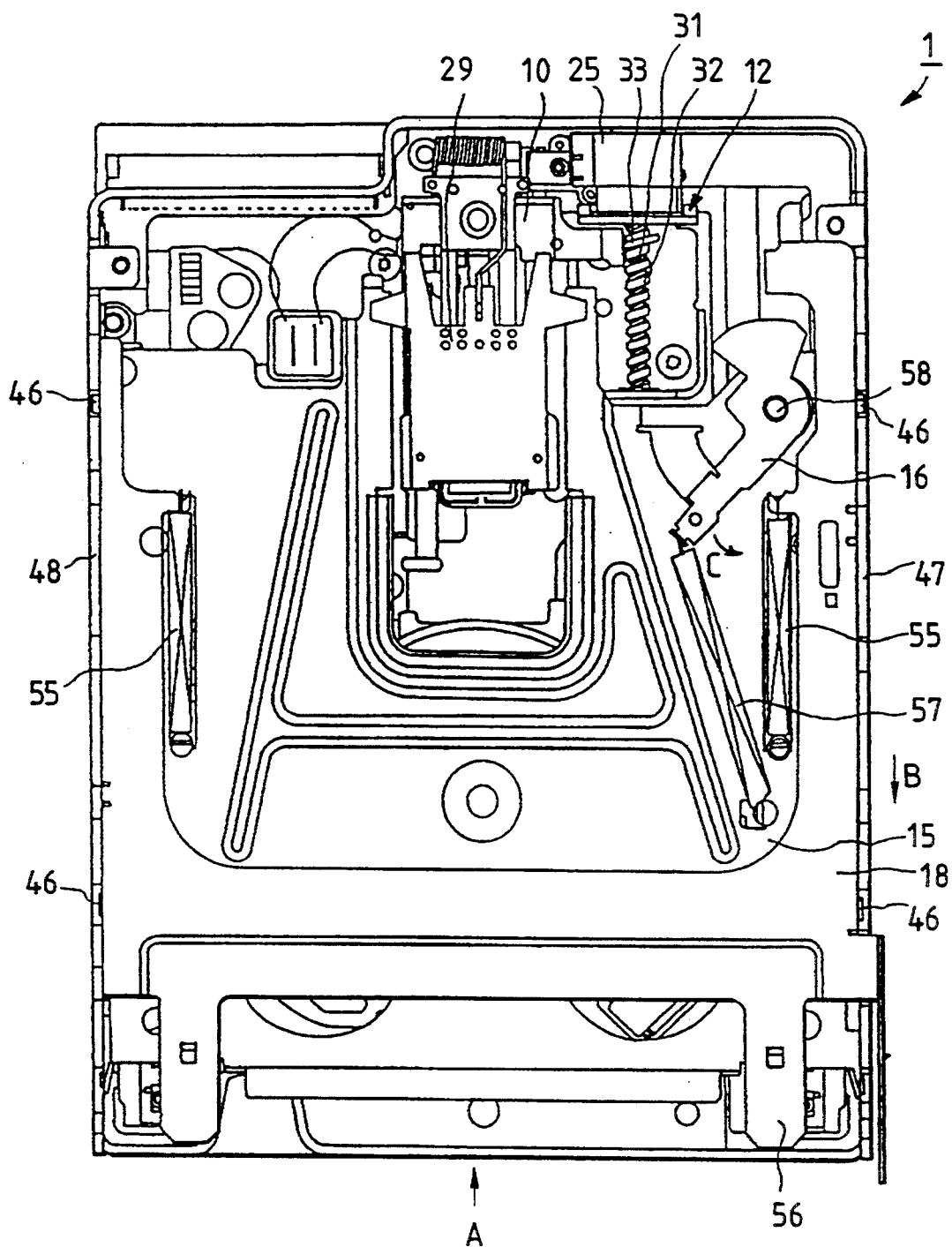
FIG. 6 is a plan view showing a disk driving apparatus according to an embodiment of the present invention.

The chassis 7 is formed by pressworking an aluminum alloy material. The carriage transfer device 12 is provided on the rear side (the upper side as seen in FIG. 6) of the disk driving apparatus 1, and the spindle mount 13 is provided on the front side (the lower side as seen in FIG. 6) thereof. The cartridge holder 15 and the slide plate 18 are arranged around the spindle mount 13. The chassis 7 has an opening 92 (FIG. 11) through which the spindle motor 4 is exposed.

Figure 8:
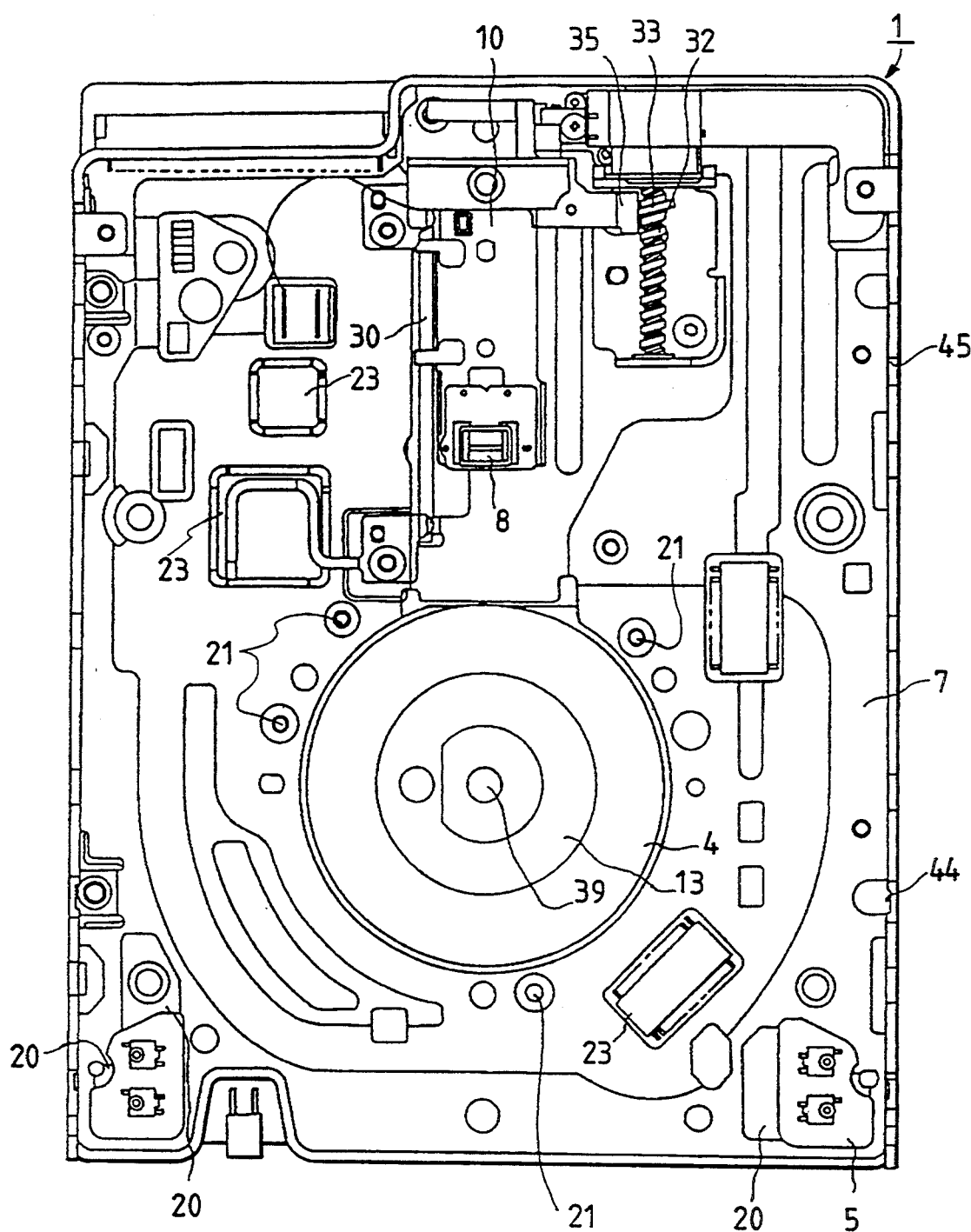
FIG. 8 is a plan view of a disk driving apparatus according to an embodiment of the present invention with the cartridge holder removed.
Figure 9:
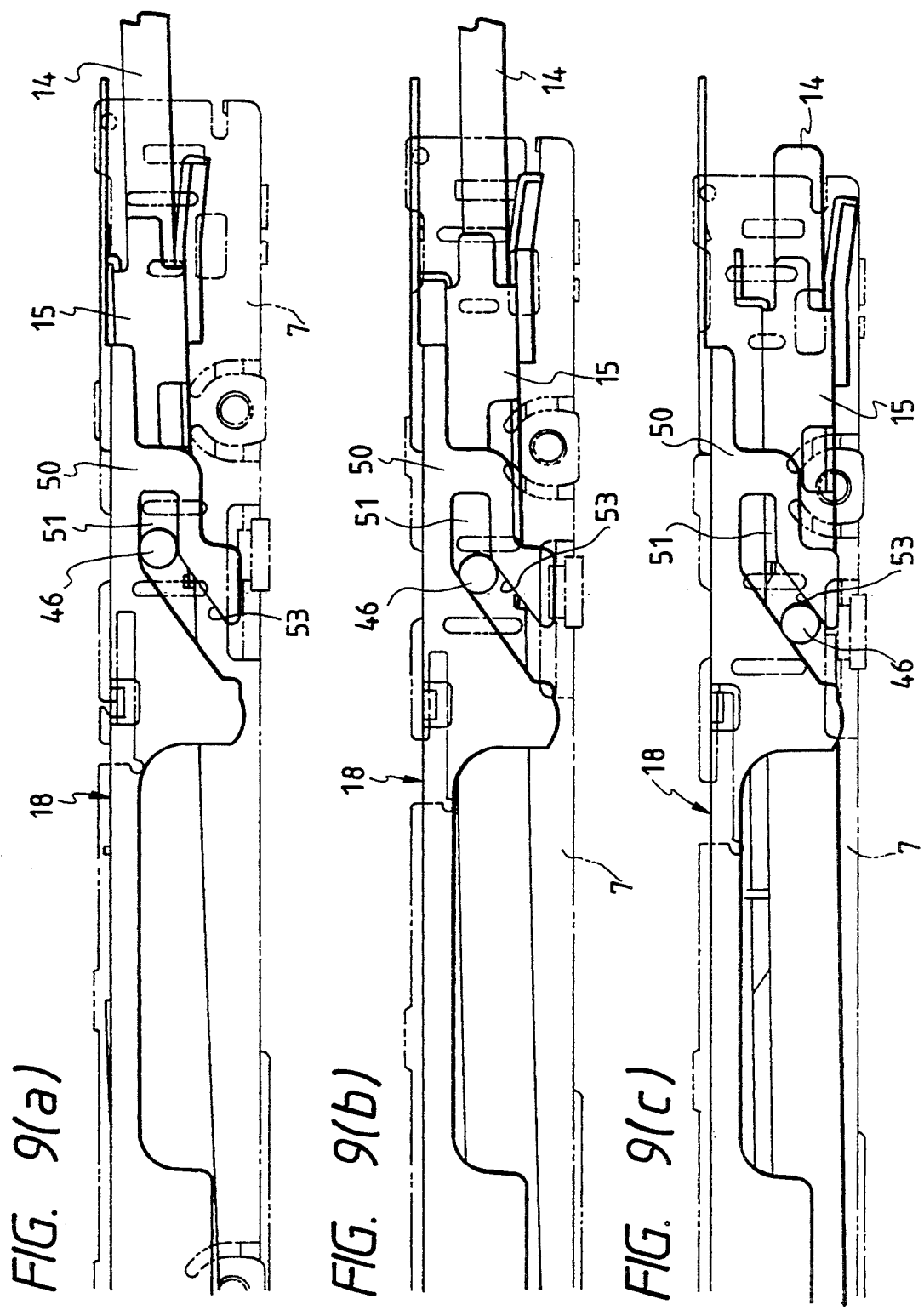
FIGS. 9(a), 9(b) and 9(c) are diagrams illustrating the disk cartridge inserting operation in a disk driving apparatus according to an embodiment of the present invention.

The FPC (flexible printed circuit board) 5, which is used instead of a conventional printed circuit board, has an opening (not shown) through which a spindle shaft 39 of a bearing 60 (FIG. 2) is passed. The lower cover 2 has an opening 28 (FIG. 11) through which the spindle motor 4 is exposed. The spindle motor 4 has a stator yoke 22 (motor yoke) (FIGS. 2, 4 and 5), inserted through the opening 28 of the lower cover 2, and is secured in position so as to retain the FPC 5. The FPC 5 can be attached to the upper surface of the stator yoke 22 by, for example, an adhesive double-coated tape. Referring to FIG. 8, numeral 20 indicates an FPC presser protruding from the chassis 7; numeral 21 indicates screws for fastening the chassis 7 and the stator yoke 22 to each other; and numeral 23 indicates an IC device. Numeral 24 (FIG. 11) indicates chip parts. Since the FPC 5 is simply attached to the stator yoke 22 by means of an adhesive tape, the stator yoke 22 need not have any special means for enabling the FPC 5 to be attached thereto, so that the stator yoke 22 can be made relatively small. Further, since this stator yoke 22, thus reduced in size, of the spindle motor 4 is partly inserted through the opening 28 formed in the lower cover 2, it is possible to reduce the height of the apparatus.

Figure 10:
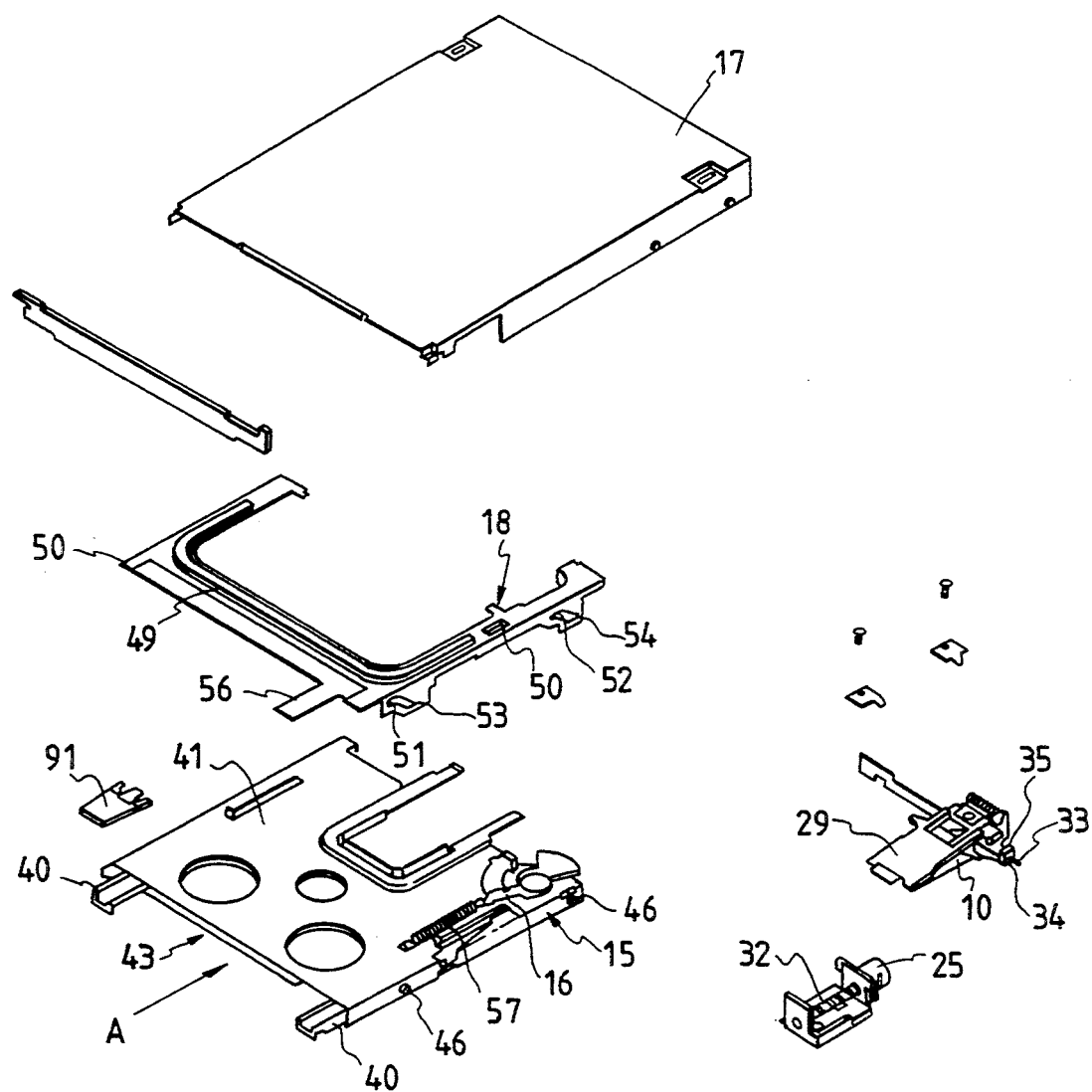
FIG. 10 is an exploded perspective view of a disk driving apparatus according to an embodiment of the present invention, showing the entire apparatus.
Figure 11:
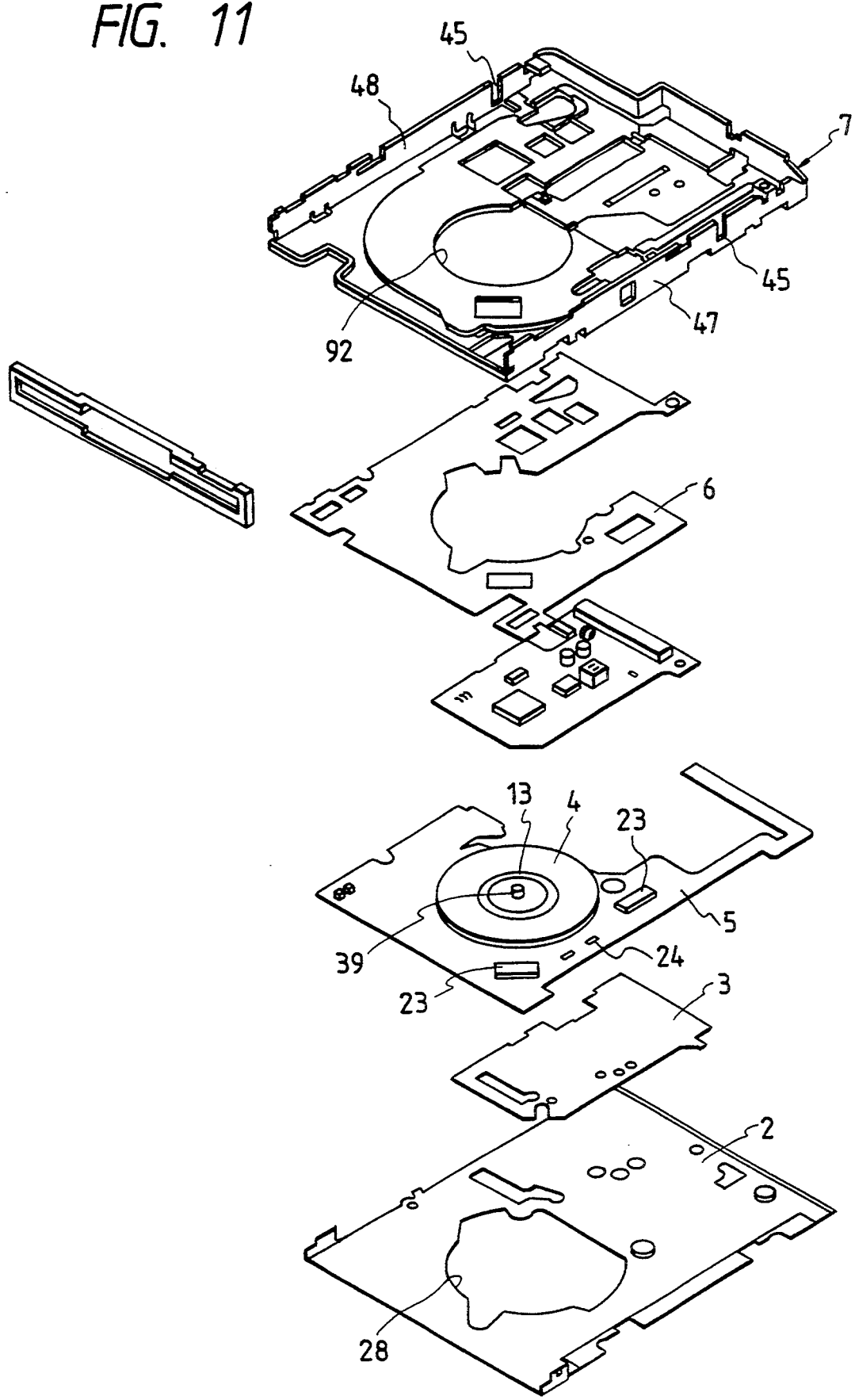
FIG. 11 is an exploded perspective view of a disk driving apparatus according to an embodiment of the present invention, showing the entire apparatus.

As shown in FIGS. 6 and 8, the carriage transfer device 12 is mainly composed of: the carriage 10 having the lower magnetic head 8 mounted thereon; a holding case 29 swingably supported at the end of the carriage 10 opposite to the magnetic head 8 and having the upper magnetic head 9 mounted thereon; a guide shaft 30 supporting the lower central section of the carriage 10; a screw shaft 32 arranged parallel to the guide shaft 30 and having a spiral feed groove 31 on its peripheral surface; and a support member 35 (FIGS. 7 and 8) protruding from the carriage 10 and supporting a follower pin 33 and a follower spring 34 (FIG. 10). The carriage 10 is slidably supported by the guide shaft 30 through the intermediation of a bearing, and is radially movable with respect to the magnetic disk 11 attached to the spindle mount 13.

As shown in FIG. 6, one end of the screw shaft 32 is connected with a stepping motor 25, and rotates in synchronism with the rotation thereof. The rotation of the screw shaft 32 is converted into a linear movement by the follower pin 33. The carriage 10 reciprocates along the guide shaft 30 in accordance with the amount of rotation of the screw shaft 32, and is transferred to a designated track position on the magnetic disk 11.

As shown in FIG. 10, the cartridge holder 15 is formed by integrally joining together a pair of cartridge retaining sections 40 with a U-shaped sectional configuration, each provided on either side, and a top plate 41 in the form of a thin plate. The lower portions of the cartridge retaining sections 40 support a part of the lower surface of the disk cartridge 14. The remaining part of the above-mentioned lower surface of the disk cartridge is all open, allowing the spindle mount 13 and a hub 42 (FIG. 12) of the magnetic disk 11 (to be described below) to face each other. A cartridge inlet 43 is provided on the side A (FIG. 10) from which the cartridge is inserted. The cartridge retaining sections 40 of the cartridge holder 15 have protrusions 46 to be engaged with guide grooves 44 and guide cutouts 45 (FIG. 7) of the chassis 7, which is to be described below. The cartridge holder 15 is constantly biased in the direction of the chassis 7 by a coil spring (not shown).

Figure 7:
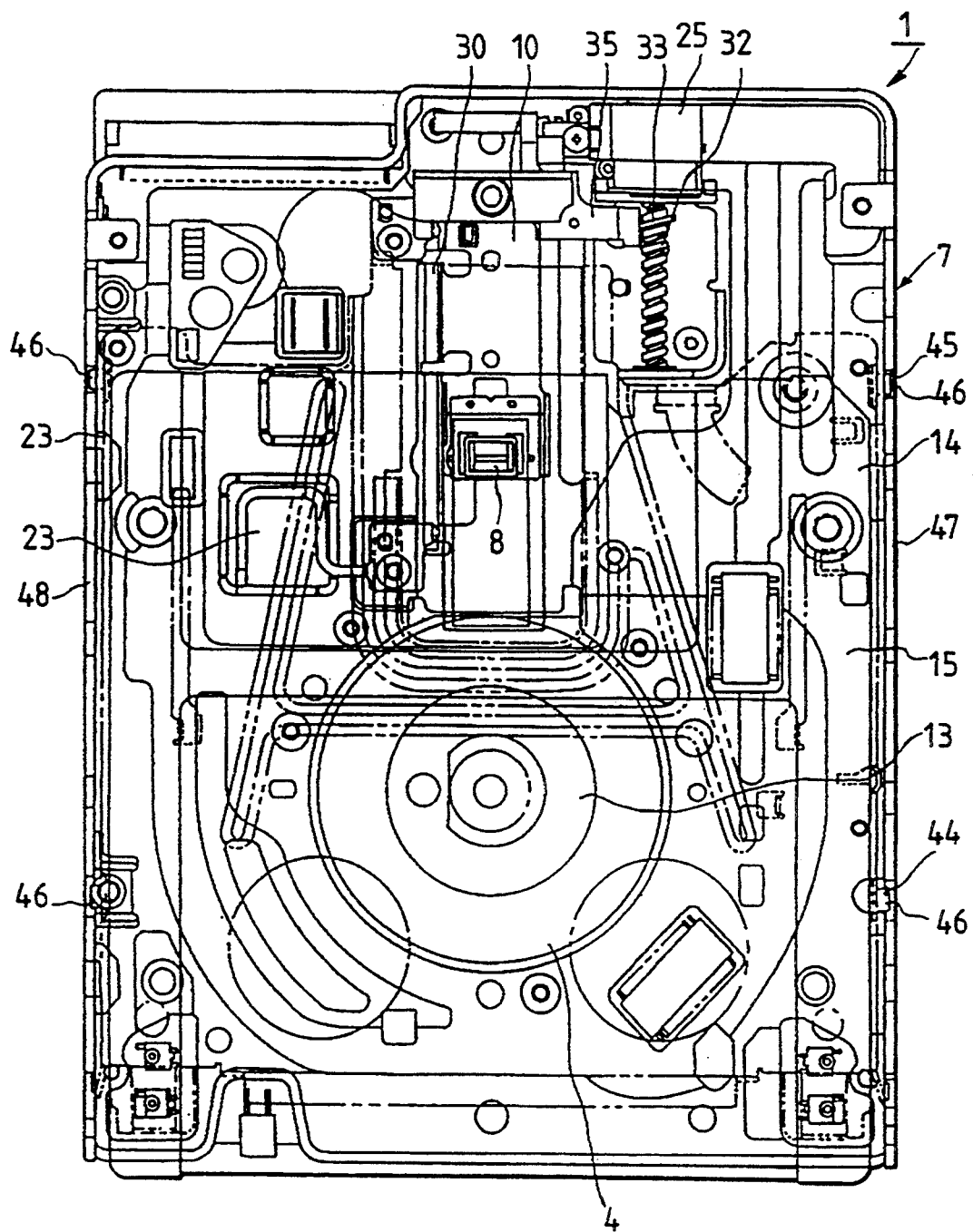
FIG. 7 is a see-through plan view showing the cartridge holder and the disk cartridge of a disk driving apparatus according an embodiment of the present invention.

As shown in FIG. 7, the above-mentioned guide grooves and guide cutouts 45 for guiding the protrusions 46, provided on the cartridge retaining sections 40 of the cartridge holder 15, are formed in the inner surfaces of side walls 47 and 48 of the chassis 7. The cartridge holder 15 is guided along the guide grooves 44 and the guide cutouts 45 so as to move substantially vertically, thereby enabling the magnetic disk 11 to be loaded and unloaded. This movement is effected by a cam mechanism (described below) which effects a vertical movement in response to the movement of the slide plate 18, which is provided on top of the cartridge holder 15 and adapted to move in parallel along the upper surface of the cartridge holder 15. When, in the condition in which the cartridge holder 15 is in the loaded state, an eject button 91 (FIG. 10) is pushed in toward the depth of the chassis 7 as indicated by the arrow B (FIG. 6), the cartridge holder 15 is pushed upward, i.e., in the unloading direction.

As shown in FIGS. 6 and 10, the slide plate 18 is attached to the upper surface of the cartridge holder 15, and is allowed to slide back and forth with respect to the cartridge holder 15 (the chassis 7). The slide plate 18 consists of an upper plate section 49 (FIG. 10) and downwardly bent side sections 50 on either side of the upper plate section 49. Provided on one of the side sections 50 are parallel cam sections 51 and 52 which are parallel to the upper surface of the chassis 7, along which the above-mentioned protrusions 46 slide when in the unloaded state, and inclined cam sections 53 and 54 which are inclined toward the depth of the chassis 7 and which cause the cartridge holder 15 to descend during the loading operation and ascend during the ejecting operation. The parallel cam section 51, which is nearer to the cartridge insertion side A, is set higher than the parallel cam section 52 on the depth side. As will be described below, the disk cartridge 14 is inserted in an inclined attitude, and becomes horizontal when the cartridge holder 15 is lowered to the loading position. The slide plate 18 is constantly biased toward the cartridge insertion side A by slide springs 55 (FIG. 6). The slide plate 18 is locked at a loading position, i.e., a pushed-in position, and retained there by an eject lever 16. The horizontal cam sections 51 and 52, the inclined cam sections 53 and 54, the guide grooves 44, the guide cutouts 45 and the protrusions 46 constitute the cam mechanism mentioned above. An eject button mounting section 56 (FIG. 10) is integrally formed on the slide plate 18.

In the upper right section (as seen in FIG. 6) of the cartridge holder 15, the eject lever 16 is swingably supported by an axle 58, with the eject lever 16 being constantly biased in the ejecting direction (counterclockwise) by an eject spring 57. The swinging end of the eject lever 16 abuts against a side end of a shutter 59 (FIG. 12) of the disk cartridge 14 to open this shutter with the swinging movement of the eject lever 16. When the disk cartridge 14 has been inserted and the cartridge holder 15 has been lowered, the eject lever 16 engages with a lock member (not shown), whereby the swinging of the eject lever 16 in the direction indicated by the arrow C (FIG. 6) is prevented, thereby locking the disk cartridge 14, with the eject lever 16 being in the pushed-in state.

Figure 12:
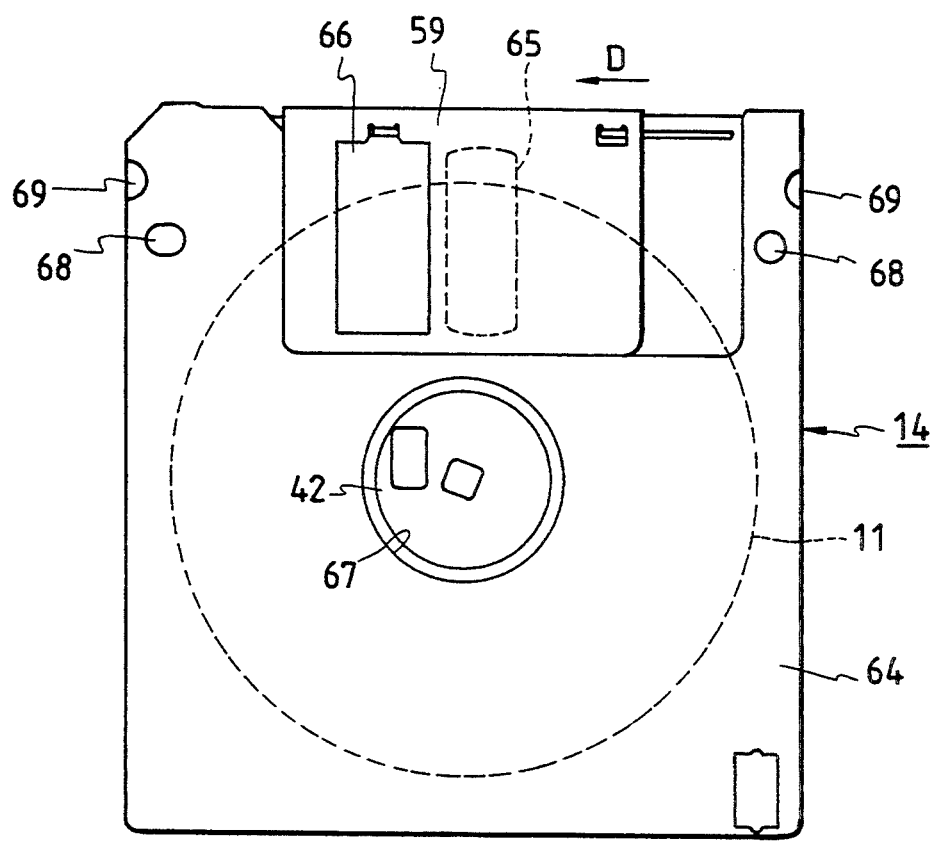
FIG. 12 is a bottom view of a disk cartridge used in a disk driving apparatus according to an embodiment of the present invention.

As shown in FIG. 12, the disk cartridge 14 consists of a hard plastic case 64 and the flexible magnetic disk 11 contained therein. At one end of the case 64, the metal shutter 59, capable of reciprocating movement, is mounted, with the metal shutter 59 being constantly biased in the closing direction (as indicated by the arrow D) by a spring (not shown) contained therein. Provided at a predetermined position on the shutter 59 is an opening 66 having substantially the same configuration as a head insertion hole 65 formed in the case 64. When the shutter 59 is opened, the head insertion hole 65 and the above opening 66 are mated with each other, thereby allowing the magnetic heads 8 and 9 to come into sliding contact with the magnetic disk from the outside of the case 64. Provided in the bottom surface of the case 64 are a hub hole 67 through which the hub 42 of the magnetic disk 11 is exposed, and positioning holes 68 for positioning the disk cartridge 14. Further, engagement grooves 69 for loading are formed on either side of the case 64.

Next, the loading and unloading operations of the magnetic disk driving apparatus 1, substantially constructed as described above, will be explained.

FIG. 9(a) shows the disk driving apparatus in the unloaded condition. The disk cartridge 14, which is inserted into the apparatus, is in an inclined attitude at the first insertion stage. Then, the swinging end of the eject lever 16 (FIG. 6) comes into contact with the side surface of the shutter 59 (FIG. 12) at the front end of the disk cartridge 14. When the disk cartridge 14 is pushed further in, the eject lever 16 swings on its axle 58, and the cartridge 14 advances inwardly while the shutter 59 thereof is gradually opened by the swinging end of the eject lever 16. When the disk cartridge 14 has been inserted to reach the innermost end of the cartridge holder 15, the lock (not shown) of the slide plate 18 (FIGS. 6 and 10) is released, and the slide plate 18 is moved downwards (as seen in FIG. 6) (i.e., toward the front side of the magnetic disk driving apparatus 1) by the resilient force of the slide springs 55. After the slide plate 18 has been released, the shutter 59 is fully open. When the disk cartridge 14 has been brought to a position where the hub 42 thereof (FIG. 12) is situated immediately above the spindle mount 13 (FIG. 11), and the disk cartridge 14 cannot be moved inwardly any more, the protrusions 46 of the cartridge holder 15 are positioned, as shown in FIG. 9(b), on the inclined cam sections 53 and 54 formed in the side wall 47 of the slide plate 18 (FIG. 10). Thus, due to the resilient force biasing the cartridge holder 15 toward the chassis 7 and the action of the inclined cam sections 53 and 54 formed in a side wall of the slide plate 18, the slide plate 18, which has been made to slide, moves further in the direction indicated by the arrow B (FIG. 6) and, as shown in FIG. 9(c), the cartridge holder 15 descends vertically toward the chassis 7 along the guide grooves 44 and the guide cutouts 45 (FIG. 7), whereby the disk 11 is loaded on the spindle 13, and the magnetic heads 8 and 9 enter the case 64 of the disk cartridge (FIG. 12) through the head insertion hole 65 to come into contact with the magnetic disk 11, thereby making it possible to perform recording or reproduction.

In this way, the upper magnetic head 9 on the side of the holding case 29 (FIG. 6) comes into contact with the magnetic disk 11, the magnetic disk 11 being held between the upper magnetic head 9 and the lower magnetic head 8 on the side of the carriage 10, whereby the loading of the magnetic disk 11 is completed.

When, after the completion of the recording or reproduction on the disk, the disk cartridge 14 is taken out, the above-mentioned eject button 91 (FIG. 10) is pushed in toward the inner section of the chassis 7. This causes the slide plate 18 to also move toward the inner section of the chassis 7, thereby causing the protrusions 46 of the cartridge holder 15 to be moved upwards along the inclined cam sections 53 and 54 to bring them onto the parallel cam sections 51 and 52 (FIGS. 9(a) to 9(c) and FIG. 10). Thus, the cartridge holder 15 is moved upwardly (i.e., away from the chassis 7) to bring it to the unloaded state. When the disk cartridge 14 is pushed further inwards, the slide plate 18 is locked at an inner position. Further, as a result of the movement of the slide plate 18, the lock of the eject lever 16 is released, and the eject lever 16 is caused to swing counterclockwise (as seen in FIG. 6) on the axle 58 by the resilient force of the eject spring 57, thereby causing the disk cartridge 14 to be ejected in the direction indicated by the arrow B (FIG. 6). During this ejection process, the shutter 59 of the disk cartridge 14, which shutter is engaged with the eject lever 16, is moved in the closing direction. Thus, the disk cartridge 14 is of course ejected when it is in the closed state. In this way, the eject lever 16 also functions as a shutter opening/closing lever. The disk cartridge 14 can be taken out by hand only after it has been ejected in the manner described above.

The disk cartridge 14 is inserted and ejected in an inclined attitude in order to prevent the upper surface of the disk cartridge 14 from abutting against the upper magnetic head 9 when the upper and lower magnetic heads 8 and 9 are on the innermost track of the magnetic disk 11, and in order to prevent the lower surface of the disk cartridge 14 from abutting against the lower magnetic head 8 when the upper and lower magnetic heads are on the outermost track of the magnetic disk 11.

As shown in FIGS. 1 through 5, the spindle motor 4 has driving coils 36 circumferentially arranged above the FPC 5, and a rotor 37 arranged in such a way as to cover these driving coils 36, a driving magnet 38 being fastened to the inner side of the outer peripheral wall of the rotor 37. The rotor 37 is fastened to the spindle shaft 39 through the intermediation of the spindle mount 13, the spindle 39 being supported by the ball bearing (the second bearing) 60. The rotor 37 and the spindle mount 13 constitute the rotating body of the spindle motor 4.

The stator yoke 22 has a plurality of annular stepped sections 19 formed by deformation processing and concentrically arranged around the rotation center of the spindle 13 in such a way that the stator yoke 22 has a stepped sectional configuration by which it is spaced gradually farther apart from the rotor 37 in accordance with its distance from the rotation center. The stator yoke 22 is so designed that when incorporated into the spindle motor it is made flat when it is attracted toward the rotor 37 by the magnetic force of the driving magnet 38. Flat sections 26 which are parallel to the plate material of the stator yoke 22 prior to the formation thereof by deformation processing are formed between the above-mentioned annular stepped sections 19, thereby connecting these sections to each other.

The spindle mount 13 and the rotor 37 are formed as separate members, and the lower peripheral section of the spindle mount 13 is extended to form a flange 13a, which receives the rotor 37 when it is incorporated into the spindle motor. The rotor 37 has a fitting hole 61 (FIG. 1) into which the spindle 13 mount is fitted from below. The stator yoke 22 has a bush 62 (the first bearing) into which the spindle mount 13 is inserted. The rotor 37 is incorporated into the spindle motor through the intermediation of the spindle mount 13, and is attracted toward the stator yoke 22 by the magnetic force of the driving magnet 38, thereby integrating the spindle mount 13 with the rotor 37. A chuck magnet for magnetically chucking the metal hub in the central section of the magnetic disk 11, a poly-slider for friction reduction, a driving pin 63 (FIGS. 2 and 3) fitted into a positioning hole of the metal hub so as to directly drive the recording medium, etc. are integrally provided on the top-surface side of the inner peripheral section of the rotor 37.

Numeral 70 (FIG. 2) indicates an FG (frequency generation) coil, and numeral 71 indicates an FG magnet.

The assembly of the spindle motor of this embodiment described above will now be explained.

First, the bearing 60 is placed on the stator yoke 22. Then, the spindle mount 13 is fitted into the oil-retaining metal bush 62 of the stator yoke 22 through the intermediation of the bearing 60, and the spindle shaft 39 is inserted into the through-hole 72 of the bush 62. Then, the rotor 37 is mounted through the intermediation of the spindle mount 13. In this process, the hole 61 (FIG. 2) of the rotor 37 is fitted onto the outer periphery of the spindle mount 13. Since the diameters of the hole 61 and the spindle mount 13 are relatively large, the above fitting is easy to perform. Then, the rotor 37 is attracted by the magnetic force of the driving magnet 38, and the spindle mount 13 is held between the rotor 37 and the bearing 60. In this way, the spindle motor is formed as an integral unit.

As described above, in this embodiment, the fitting hole 61 of the rotor 37 is fitted onto the outer peripheral section of the spindle 13, and due to the large diameters of the hole and the spindle mount, the assembly operation is easy to perform.

Further, in this embodiment, the spindle motor is assembled by laying the components one on top of the other in the following order: the stator yoke 22, the bearing (the second bearing), the spindle shaft 39 (the spindle mount 13), and the rotor 37, so that the spindle motor can be easily assembled by a manual operation.

Also, in this embodiment, the spindle shaft 39 (the spindle mount 13) is inserted into the bush 62 prior to the mounting of the rotor 37, so that no excessive force is applied to the bush 62, thereby preventing gouging of the inner bore of the bush, wobbling of the shaft therein, etc.

In addition, in this embodiment, the spindle mount 13 and the rotor 37 are not joined together by caulking or gluing, so that deformation of the rotor by any excessive stress or variation in the height of the spindle motor and wobbling of the shaft therein due to an adhesive layer can be avoided.

Further, as stated above, in this embodiment, the stator yoke 22 has a step-like sectional configuration by which it is spaced gradually farther apart from the rotor 37 in accordance with its distance from the rotation center, so that after the rotor 37 has been mounted on the stator yoke 22, the stator yoke 22 is flat even when the magnetic force of the driving magnet 38 is applied thereto, thereby preventing the driving magnet 38 and the driving coils 36 from coming into contact with each other. Further, since the gap between the driving magnet 38 and the driving coils 36 can be made small, the height of the spindle motor can be reduced, thereby contributing to a reduction in the thickness of the disk driving apparatus.

In the above-described embodiment, the spindle motor 4 is assembled by laying the rotor, etc. one on top of the other, and the rotor, etc. are retained in the assembled state solely by the magnetic force of the driving magnet being applied thereto. However, with the standard level of attracting force used in this field at present, there is the danger that the rotor will be caused to come off from the spindle motor 4 by a shock of approximately 110 G. This might be prevented by providing an anti-detachment member, which, however, is difficult to realize when the resulting increase in the cost of the spindle motor 4 is taken into consideration.

In view of this, the cartridge holder is equipped with a rotor presser plate, which is kept at a lowered position when no recording medium is loaded in the disk driving apparatus; and, when a recording medium is loaded, this rotor presser plate is raised by the medium. This rotor presser plate contributes improves the rigidity of the cartridge holder in the unloaded state, and also helps to prevent the head from being affected by a shock.

Figure 13A:
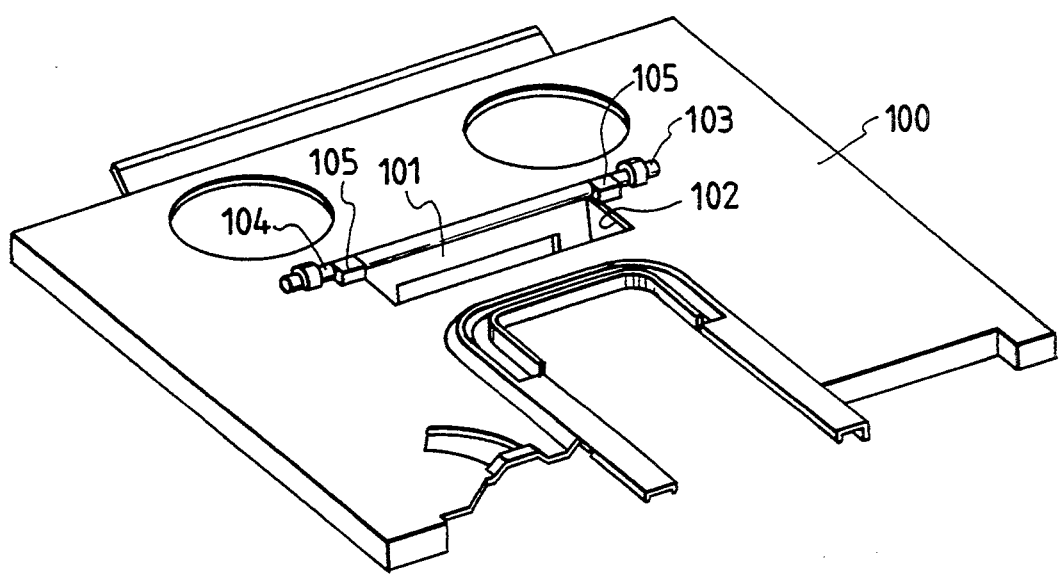
FIGS. 13(a) and 13(b) are perspective views of the cartridge holder of a disk driving apparatus at the time of medium ejection and medium loading, respectively.
Figure 13B:
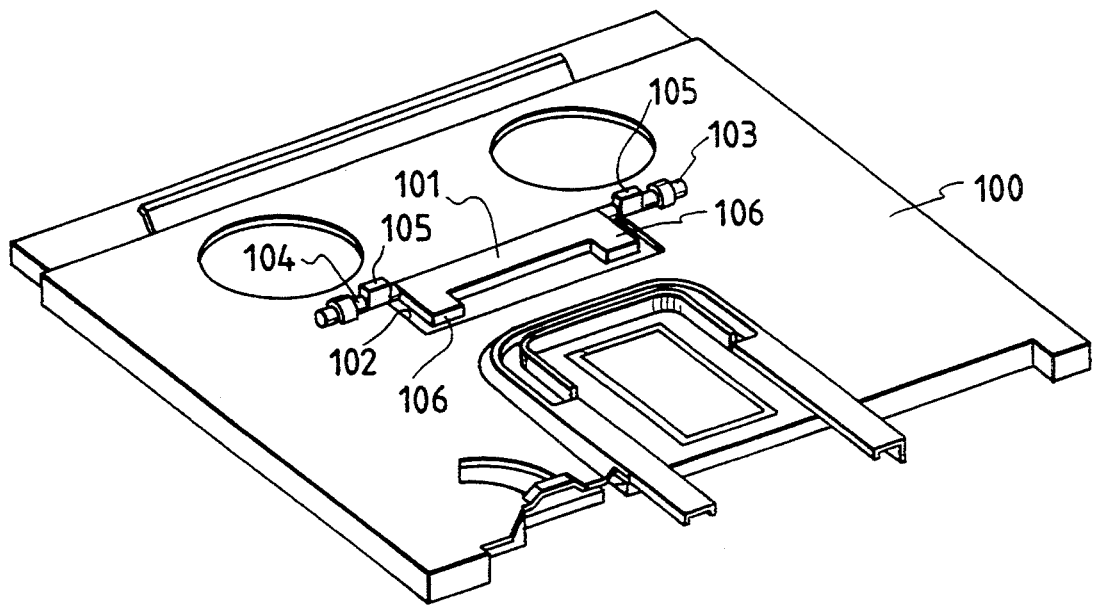
Figure 14:
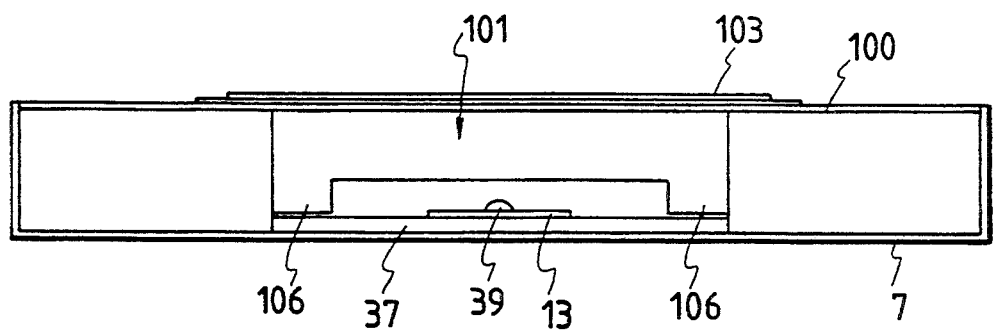
FIG. 14 is a front view of FIG. 13(a)

FIGS. 13(a), 13(b) and 14 show a cartridge holder 100 equipped with a rotor presser plate 101, which is rotatably arranged on the cartridge holder. Numeral 102 indicates an opening formed in the cartridge holder 100; numeral 103 indicates a rotation shaft of the rotor presser plate 101; numeral 104 indicates a coil spring which biases the rotor presser plate 101 toward its position inside the cartridge holder 100 (the position shown in FIG. 13(a)); and numeral 105 indicates stoppers for restricting the swinging range of the rotor presser plate 101. When a disk cartridge is inserted into the cartridge holder 100, the front end of the disk cartridge abuts against the rotor presser plate 101, which is swung upwards to overcome the resilient force of the coil spring 104. The rotor presser plate 101 has a cutout at the center of its free-end section thereof which defines two rotor presser sections 106 protruding therefrom.

Next, the operation of the cartridge holder shown in FIGS. 13(a) and 13(b) will be described.

When ejecting a recording medium, the rotor presser plate 101 is retained in its position inside the cartridge holder 100 by the coil spring 104, while the stoppers 105 are abutted against the upper surface of the cartridge holder 100 and the rotor presser sections 106 are in contact with or in close proximity to the rotor 37, as shown in FIGS. 13(a) and 14. Accordingly, as stated above, even if a shock strong enough cause the rotor 37 to come off is applied to the driving apparatus, the rotor 37 is prevented from coming off due to the rotor presser sections 106. When, in the condition of FIG. 13(a), a disk cartridge is inserted into the cartridge holder 100, the front end of the disk cartridge abuts against the rotor presser plate 101, to cause the rotor presser plate 101 to swing upwards to overcome the resilient force of the coil spring 104 (see FIG. 13(b)).

Figure 17:
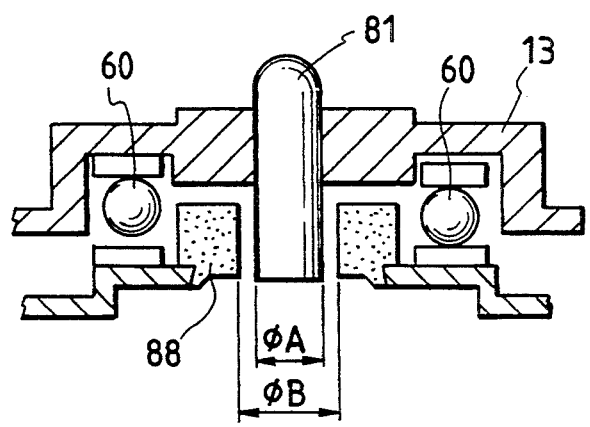
FIG. 17 is a diagram illustrating, as a comparative example, a conventional spindle motor for magnetic disk driving apparatuses.

As shown in FIG. 17, in the bearing structure of a conventional spindle motor, there is a clearance between the diameter OA of the spindle shaft 81 and the diameter OB of the metal bush 88. Thus, movement of the spindle 81 due to this clearance is inevitable. Therefore, in the MDSA adjustment, which is conducted for the purpose of properly positioning the carriage 10 and the holding case 29, a variation in alignment is liable to occur, for the above reason, between a condition in which the adjustment has been completed and a condition in which the mounting screws have been fastened. As a result, it is possible to erroneously assume that a change due to screwing has occurred when in reality there has been no such change.

Figure 15A:
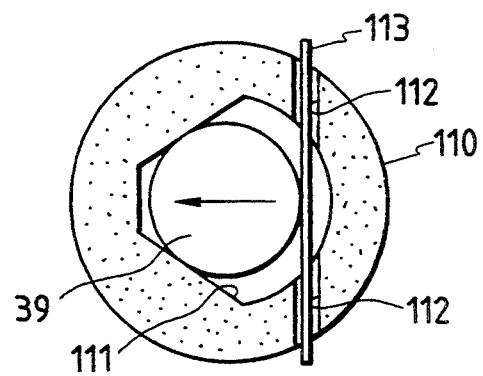
FIGS. 15(a) and 15(b) are diagrams illustrating a modification of the bearing of a disk driving apparatus according to an embodiment of the present invention.
Figure 15B:
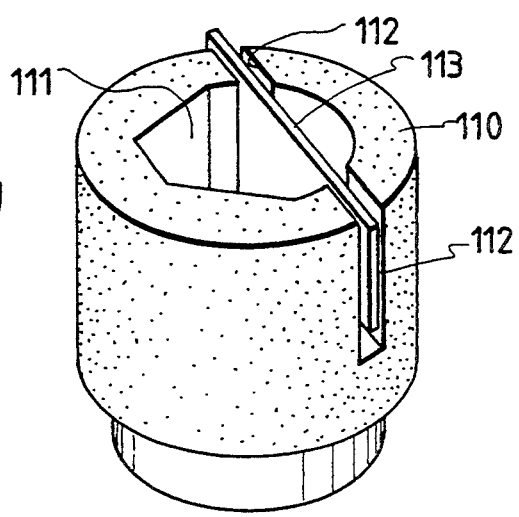

In view of this, the metal bush may be constructed as shown in FIG. 15.

Figure 16:
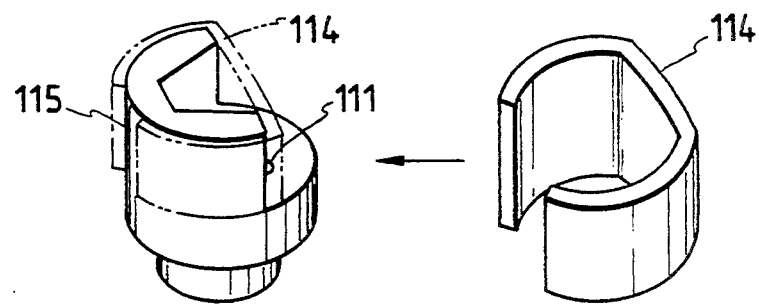
FIG. 16 is a diagram showing the modification of FIGS. 15(a) and 15(b)

Referring to FIG. 15, numeral 110 indicates a metal bush, in which a through-hole 111 having a fan-shaped sectional configuration is formed as shown in FIG. 15(a). Further, grooves 112 extending across the arc portion of the fan-shaped section are cut from above. A plate spring 113 is inserted in these grooves 112. In the condition in which the plate spring 113 has been inserted into the grooves 112, the outer peripheral surface of the spindle shaft 39 is in contact with the inner surfaces of the through-hole 111 of the metal bush 110 at two points of the inner surfaces, and with the plate spring 113 at one point thereof. Accordingly, the spindle shaft 39 is pressed against the inner surface of the through-hole 111 of the metal bush 110 by the plate spring 113, thereby reducing the above-mentioned clearance to zero. As shown in FIG. 16, it is also possible to adopt a structure in which a plate spring 114 is fitted onto the outer periphery of a metal bush 115.

FIG. 19 shows a conventional bearing structure, in which the outer diameter of a spindle shaft 81 is received by an oil-retaining metal bush 88 to center the shaft. In this centering system, however, the diameter of the oil-retaining metal bush 88 is small, so that it is difficult to reduce the dimensional tolerance. Further, since the volume of the oil-retaining metal bush 88 is small, the amount of oil retained is rather small.

Figure 18:
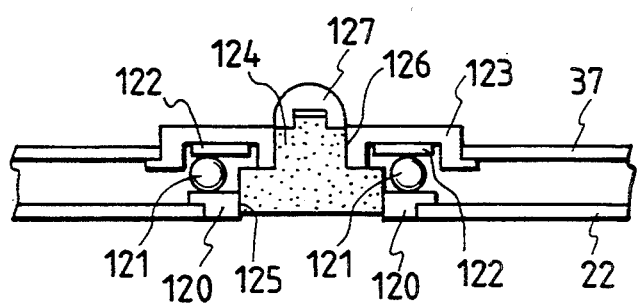
FIG. 18 is a diagram illustrating another modification of the bearing of a disk driving apparatus according to an embodiment of the present invention.

In view of this, it is possible to adopt a bearing structure as shown in FIG. 18, in which a lower ring 120 made of stainless steel, iron or the like is fitted into the stator yoke 22 and secured thereto. This lower ring 120 constitutes, together with an upper ring 122, a bearing having balls 121 provided between the two rings. The upper ring 122 is opposed to the lower surface of a spindle mount 123. Numeral 124 indicates an oil-retaining metal spindle shaft, a lower end section 125 of which is fitted into the hole of the lower ring 120; and an upper end section 126 of which is forced into the hole of the spindle mount 123. Numeral 127 indicates a protective cap of hard metal covering the top section of the spindle shaft 124. Thus, the spindle shaft 124 can rotate while being supported by the lower ring 120. Since the diameter of the ring for centering can be made large, it is possible to reduce the dimensional tolerance. Further, since the volume of the oil-retaining metal shaft can be made large, the amount of oil retained can be increased.

Figure 22A:
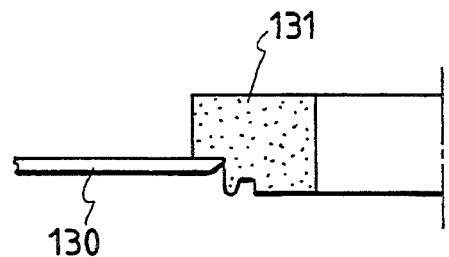
FIG. 22(a), 22(b) and 22(c) are diagrams illustrating, as a comparative example, still another conventional spindle motor for magnetic disk driving apparatuses, FIG. 22(a) showing the condition prior to caulking, FIG. 22(b) the condition after caulking, and FIG. 22(c) the condition after incorporating the rotor.
Figure 22B:
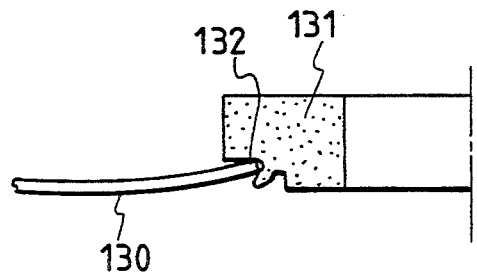
Figure 22C:
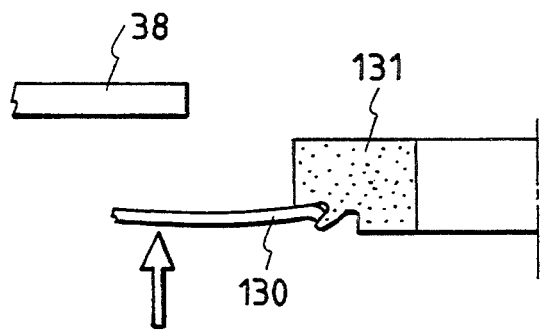
Figure 23:
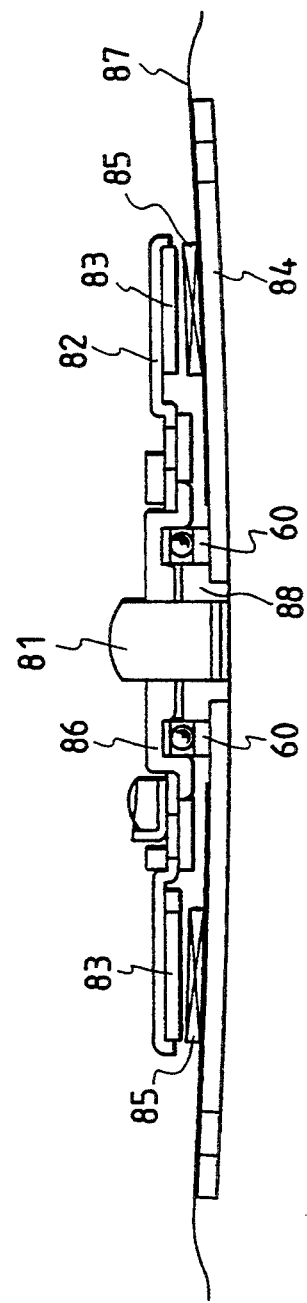
FIG. 23 is a longitudinal sectional view of a spindle motor used in a conventional magnetic disk driving apparatus.
Figure 24:
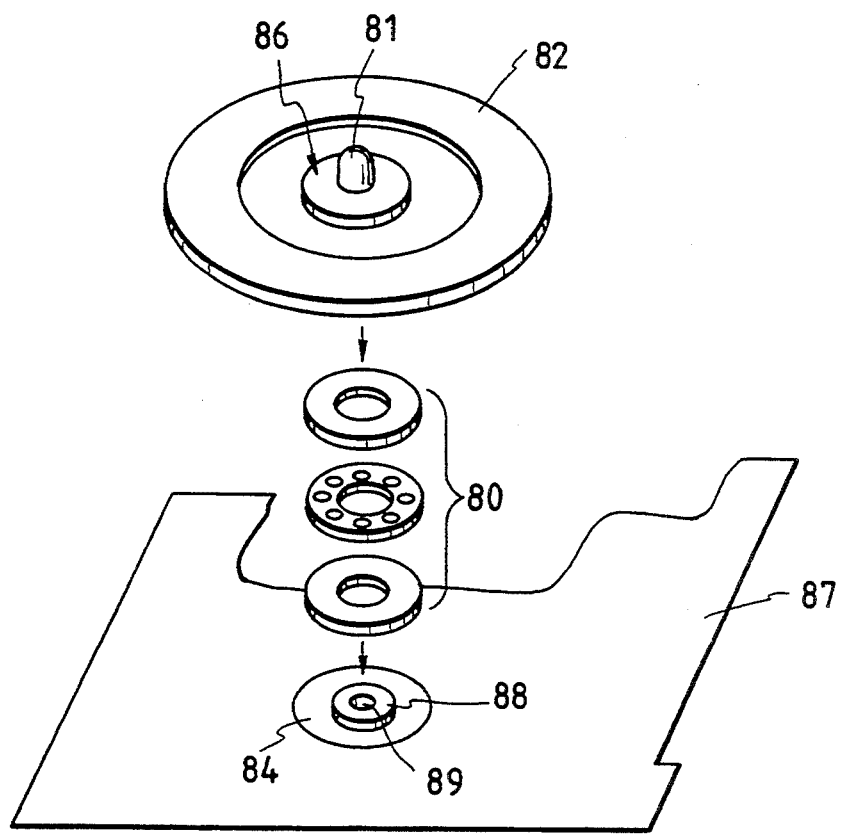
FIG. 24 is an exploded perspective view of an essential part of FIG. 23.

FIG. 22(a) shows a conventional bearing structure. When, in the condition shown in the drawing, a stator yoke 130 consisting of a base plate of iron is joined with a brass bush 131 (the first bearing) by caulking, the stator yoke 130 is warped so as to cause only its inner peripheral section 132 to come into contact with the brass bush 131, while the outer peripheral section of the brass bush 131 does not contact the stator yoke 130, that is, as shown in FIG. 22(b), the stator yoke 130 and the brass bush 131 are in point contact. Thus, as shown in FIG. 22(c), the stator yoke 130 is liable to be deflected by the magnetic force of the driving magnet 38 arranged on the rotor 37. Further, the warping amount at the time of caulking and the deflection amount by the magnetic force become both unstable.

Thus, in a modification as shown in FIGS. 20(a) and 20(b), a protrusion 141 is provided on the lower edge of the outer periphery of that portion of a bush 140 which is caulked. Or, as shown in FIGS. 21(a) and 21(b), a tapered section 143 is provided on the lower peripheral section of the caulked portion of a bush 142. These structures allow the caulked portion of the stator yoke 130 to be supported by holding it in contact with more than one peripheral section of the caulked portion of the bush 141, 142, so that the stator yoke 130 is not easily deflected as in the conventional structure. Further, these structures also provide the advantage that the deflection amount is stabilized.

What is claimed is:

1. A disk driving device including a spindle motor which comprises:
a rotating shaft;

a rotation table to which said rotating shaft is fastened, the rotation table including a flange;
a rotor defining a fitting hole into which said rotation table is received such that said rotor is supported by the flange of said rotation table;
a driving magnet attached to said rotor;
driving coils opposed to said driving magnet; and
a stator yoke to which said driving coils are attached and which includes a bearing,
wherein said rotor is removably mounted on said rotation table,
wherein said rotating shaft is inserted into said bearing to rotatably connect said rotation table to said stator yoke,
wherein said rotor is attracted toward said stator yoke by a magnetic force of said driving magnet, thereby integrally combining said rotation table and said rotor,
wherein said driving magnet is arranged on a side of an outer periphery of said rotor, and
wherein said stator yoke includes a plurality of concentric rings forming a step-like sectional configuration around a rotation center such that each one of said plurality of concentric rings is spaced gradually farther from said rotor in accordance with a distance between said each one of said plurality of rings and the rotation center.

* * * * *